US007565295B1

(12) United States Patent
Hernandez-Rebollar

(10) Patent No.: US 7,565,295 B1
(45) Date of Patent: Jul. 21, 2009

(54) METHOD AND APPARATUS FOR TRANSLATING HAND GESTURES

(75) Inventor: Jose L. Hernandez-Rebollar, Washington, DC (US)

(73) Assignee: The George Washington University, Washington, DC (US)

( * ) Notice: Subject to any disclaimer, the term of this patent is extended or adjusted under 35 U.S.C. 154(b) by 529 days.

(21) Appl. No.: 10/927,508

(22) Filed: Aug. 27, 2004

Related U.S. Application Data

(60) Provisional application No. 60/498,381, filed on Aug. 28, 2003, provisional application No. 60/574,994, filed on May 28, 2004.

(51) Int. Cl.
*G10L 15/00* (2006.01)
(52) U.S. Cl. .................. 704/271; 704/270; 382/182
(58) Field of Classification Search .............. 382/182; 704/271, 270
See application file for complete search history.

(56) References Cited

U.S. PATENT DOCUMENTS

| | | | |
|---|---|---|---|
| 4,414,537 A | 11/1983 | Grimes | |
| 5,047,952 A | 9/1991 | Kramer et al. | |
| 5,481,454 A | 1/1996 | Inoue et al. | |
| 5,581,484 A * | 12/1996 | Prince | 702/150 |
| 5,659,764 A | 8/1997 | Sakiyama et al. | |
| 5,699,441 A | 12/1997 | Sagawa et al. | |
| 5,714,698 A | 2/1998 | Tokioka et al. | |
| 5,743,923 A | 4/1998 | Davies et al. | |
| 5,887,069 A | 3/1999 | Sakou et al. | |
| 5,953,693 A * | 9/1999 | Sakiyama et al. | 704/3 |
| 5,990,878 A | 11/1999 | Ikeda et al. | |
| 6,035,274 A * | 3/2000 | Kramer et al. | 704/270 |
| 6,110,130 A | 8/2000 | Kramer | |
| 6,128,004 A | 10/2000 | McDowall et al. | |

(Continued)

FOREIGN PATENT DOCUMENTS

WO    WO 2004114107 A1 * 12/2004

OTHER PUBLICATIONS

Jose L. Hernandez-Rebollar et al., "A Multi-Class Pattern Recognition System for Practical Finger Spelling Translation"; presented at International Conference on Multimodal Interfaces, 2002.

(Continued)

*Primary Examiner*—Daniel D Abebe
(74) *Attorney, Agent, or Firm*—Todd Juneau

(57) ABSTRACT

A sign language recognition apparatus and method is provided for translating hand gestures into speech or written text. The apparatus includes a number of sensors on the hand, arm and shoulder to measure dynamic and static gestures. The sensors are connected to a microprocessor to search a library of gestures and generate output signals that can then be used to produce a synthesized voice or written text. The apparatus includes sensors such as accelerometers on the fingers and thumb and two accelerometers on the back of the hand to detect motion and orientation of the hand. Sensors are also provided on the back of the hand or wrist to detect forearm rotation, an angle sensor to detect flexing of the elbow, two sensors on the upper arm to detect arm elevation and rotation, and a sensor on the upper arm to detect arm twist. The sensors transmit the data to the microprocessor to determine the shape, position and orientation of the hand relative to the body of the user.

9 Claims, 5 Drawing Sheets

U.S. PATENT DOCUMENTS

| | | |
|---|---|---|
| 6,141,643 A | 10/2000 | Harmon |
| 6,215,890 B1 * | 4/2001 | Matsuo et al. .............. 382/103 |
| 6,304,840 B1 | 10/2001 | Vance et al. |
| 6,477,239 B1 | 11/2002 | Ohki et al. |
| 6,819,782 B1 * | 11/2004 | Imagawa et al. ............ 382/115 |
| 6,965,842 B2 | 11/2005 | Rekimoto et al. |
| 7,012,593 B2 | 3/2006 | Yoon et al. |
| 2002/0130573 A1 | 9/2002 | Kikuchi et al. |
| 2002/0152077 A1 | 10/2002 | Patterson |
| 2004/0102931 A1 | 5/2004 | Ellis et al. |
| 2005/0178213 A1 | 8/2005 | Skowronski |
| 2005/0271279 A1 * | 12/2005 | Fujimura et al. ............ 382/203 |

OTHER PUBLICATIONS

Jose L. Hernandez-Rebollar et al., "A New Instrumented Approach for Translating American Sign Language Into Sound and Text"; presented at International Conference on Face and Gesture Recognition, May 18, 2004.

Jose L. Hernandez-Rebollar, "Phonetic Model for Automatic Recognition of Hand Gestures"; presented at International Conference on Language Resources and Evaluation, May 31, 2004.

McGuire et al., "Towards a One-Way American Sign Language Translator"; presented at International Conference on Face and Gesture Recognition, May 18, 2004.

* cited by examiner

METHOD AND APPARATUS FOR TRANSLATING HAND GESTURES

CROSS-REFERENCE TO RELATED APPLICATION

This application claims the benefit of provisional application Ser. No. 60/498,381, filed Aug. 28, 2003, and provisional application Ser. No. 60/574,994, filed May 28, 2004, which are hereby incorporated by reference in their entirety.

FIELD OF THE INVENTION

The present invention is directed to a method and apparatus for detecting and measuring hand gestures and converting the hand gestures into speech or text. The invention is particularly directed to an apparatus that is able to detect sign language by detecting hand and finger movement, position and orientation with respect to a fixed position on the body of the user.

BACKGROUND OF THE INVENTION

Hand shape and gesture recognition has been an active area of investigation during the past decade. Beyond the quest for a more "natural" interaction between humans and computers, there are many interesting applications in robotics, virtual reality, tele-manipulation, tele-presence, and sign language translation. According to the American Sign Language Dictionary, a sign is described in terms of four components: hand shape, location in relation to the body, movement of the hands, and orientation of the palms. Hand shape (position of the fingers with respect to the palm), the static component of the sign, along with the orientation of the palm, forms what is known as "posture". A set of 26 unique distinguishable postures makes up the alphabet in ASL used to spell names or uncommon words that are not well defined in the dictionary.

While some applications, like image manipulation and virtual reality, allow the researcher to select a convenient set of postures which are easy to differentiate, such as point, rotate, track, fist, index, victory, or the "NASA Postures", the well-established ASL alphabet contains some signs which are very similar to each other. For example, the letters "A", "M", "N", "S", and "T" are signed with a closed fist. The amount of finger occlusion is high and, at first glance, these five letters can appear to be the same posture. This makes it very hard to use vision-based systems in the recognition task. Efforts have been made to recognize the shapes using the "size function" concept on a Sun Sparc Station with some success. Some researchers achieved a 93% recognition rate in the easiest (most recognizable letters), and a 70% recognition rate in the most-difficult case (the letter "C"), using colored gloves and neural networks. Others have implemented a successful gesture recognizer with as high as 98% accuracy.

Despite instrumented gloves being described as "cumbersome", "restrictive", and "unnatural" for those who prefer vision-based systems, they have been more successful recognizing postures. The Data Entry Glove, described in U.S. Pat. No. 4,414,537 to Grimes, translates postures to ASCII characters to a computer using switches and other sensors sewn to the glove.

In a search of more-affordable options, a system for Australian Sign Language based on Mattel's Power Glove was proposed, but the glove could not be used to recognize the alphabet hand shapes because of a lack of sensors on the little finger. Others mounted piezo-resistive accelerometers on five rings for a typing interface, and some used accelerometers at the fingertips to implement a tracking system for pointing purposes. These gloves have not been applied to ASL finger spelling.

American Sign Language (ASL) is the native language of some 300,000 to 500,000 people in North America. It is estimated that 13 million people, including members of both the deaf and hearing populations, can communicate to some extent in sign language just in the United States, representing the fourth most used language in this country. It is, therefore, appealing to direct efforts toward electronic sign language translators.

Researchers of Human-Computer Interaction (HCI) have proposed and tested some quantitative models for gesture recognition based on measurable parameters. Yet, the use of models based on the linguistic structure of signs that ease the task of automatic translation of sign language into text or speech is in its early stages. Linguists have proposed different models of gesture from different points of view, but they have not agreed on definitions and models that could help engineers design electronic translators. Existing definitions and models are qualitative and difficult to validate using electronic systems.

As with any other language, differences are common among signers depending on age, experience or geographic location, so the exact execution of a sign varies but the meaning remains. Therefore, any automatic system intended to recognize signs has to be able to classify signs accurately with different "styles" or "accents". Another important challenge that has to be overcome is the fact that signs are already defined and cannot be changed at the researcher's convenience or because of sensor deficiencies. In any case, to balance complexity, training time, and error rate, a trade-off takes place between the signer's freedom and the device's restrictions.

Previous approaches have focused on two objectives: the hand alphabet which is used to fingerspell words, and complete signs which are formed by dynamic hand movements.

The instruments used to capture hand gestures can be classified in two general groups: video-based and instrumented. The video-based approaches claim to allow the signer to move freely without any instrumentation attached to the body. Trajectory, hand shape and hand locations are tracked and detected by a camera (or an array of cameras). By doing so, the signer is constrained to sign in a closed, somehow controlled environment. The amount of data that has to be processed to extract and track hands in the image also imposes a restriction on memory, speed and complexity on the computer equipment.

To capture the dynamic nature of hand gestures, it is necessary to know the position of the hand at certain intervals of time. For instrumented approaches, gloves are complemented with infrared, ultrasonic or magnetic trackers to capture movement and hand location with a range of resolution that goes from centimeters (ultrasonic) to millimeters (magnetic). The drawback of these types of trackers is that they force the signer to remain close to the radiant source and inside a controlled environment free of interference (magnetic or luminescent) or interruptions of line of sight.

A number of sign language recognition apparatus and gesture recognition systems have been proposed. Examples of these prior devices are disclosed in U.S. Pat. Nos. 5,887,069 to Sakou et al., 5,953,693 to Sakiyama et al., 5,699,441 to Sagawa et al., 5,714,698 to Tokioka et al., 6,477,239 to Ohki et al., and 6,304,840 to Vance et al.

While a number of these prior apparatus have been successful for their intended purpose, there is a continuing need for improved sign language recognition systems.

SUMMARY OF THE INVENTION

The present invention is directed to a method and apparatus for translating hand gestures into speech and text. More particularly, the invention is directed to a method and apparatus for converting sign language into speech or text.

Accordingly, a primary aspect of the invention is to provide an apparatus that is able to detect hand position and movement with respect to the body and hand shape and hand orientation. The hand movement and shape are detected by sensors to provide signals corresponding to the movement and shape. The signals are received by a translation device, such as a computer, to translate the signals into computer-generated speech or text.

Another aspect of the invention is to provide an apparatus for translating hand gestures into speech or text by providing sensors on the back of the hand to detect motion and orientation of the hand.

Another aspect of the invention is to provide an apparatus for translating hand gestures into speech or written text where a sensor is included to detect and measure flexing of the elbow and orientation of the forearm with respect to the upper arm and body.

A further aspect of the invention is to provide an apparatus for translating hand gestures into speech or written text where a sensor is included to detect and measure motion and orientation of the upper arm with respect to the body.

The invention also includes electronic circuitry connected to the sensors that detect the various movements and orientation of the hand, arm, and fingers, computes logical operations by recognition algorithm to generate ASCII characters, and converts the ASCII characters into a synthesized speech or written text.

The various aspects of the invention are basically attained by providing a sign language recognition apparatus which comprises an input assembly for continuously detecting sign language. The input assembly detects the position of each finger with respect to the hand, and movement and position of the hand with respect to the body. The input assembly generates values corresponding to a phoneme. A word storage device for storing sign language as a sequence of phonemes receives the values from the input assembly, matches the value with a stored language phoneme, and produces an output value corresponding to the language phoneme. Phonemes refer to linguistic units. In this case, phonemes refer to the smallest distinguishable unit that make up a sign; with similar linguistic properties as phonemes in spoken languages: a finite number of phonemes are put together according to certain rules (syntax) to form signs (words in spoken languages), in turn, a sequence of signs generate phrases if another set of rules (grammar) is followed.

The aspects of the invention are further attained by providing a sign language recognition apparatus comprising an input assembly for detecting sign language. A computer is connected to the input assembly and generates an output signal for producing a visual or audible output corresponding to the sign language. The input assembly comprises a glove to be worn by a user. The glove has sensors for detecting the position of each finger and thumb, and a sensor to detect and measure palm orientation. An elbow sensor detects and measures flexing and positioning of the forearm about the elbow. A shoulder sensor detects movement and position of the arm with respect to the shoulder.

The aspects of the invention are yet further attained by providing a method for translating a sign into a phoneme, comprising the steps of determining an initial and final pose of the sign, and a movement of the sign, the movement occurring between the initial and final pose, the pose of the sign comprised of an initial posture part and a hand location part. Then the method matches the detected (as captured by the instrument) initial posture of the sign with the initial postures of all known signs, and defines a first list of candidate signs as those more than one signs whose initial posture matches the captured initial posture or, if there is only one match, returns a first most likely sign corresponding to the match; matches the captured initial hand location of the sign with one or more hand locations of the first list of candidate signs, and defines a second list of candidate signs as those more than one signs whose hand locations matches the determined initial hand location, or, if there is only one match, returns a second most likely sign corresponding to the match. The method then matches the captured movement of the sign with one or more movements of the second list of candidate signs, and a defines a third list of candidate signs as those more than one signs whose movements matches the determined movements, or, if there is only one match, returning a third most likely sign corresponding to the match. Then the method matches the captured final posture of the sign with one or more postures of the third list of candidate signs, and defines a fourth list of candidate signs as those more than one signs whose final posture matches the determined final posture, or, if there is only one match, returns a fourth most likely sign corresponding to the match. The method then matches the determined final hand location of the sign with one hand location of the fourth list of candidate signs, and returns a fifth most likely sign corresponding to the match; and returns the first, second, third, fourth or fifth most likely sign as a stream of ASCII characters to be displayed as text or be converted into speech by a speech synthesizer.

These and other aspects and advantages will become apparent from the following detailed description of the invention which discloses various embodiments of the invention.

BRIEF DESCRIPTION OF THE DRAWINGS

The following is a brief description of the drawings, in which.

DETAILED DESCRIPTION OF THE INVENTION

The present invention is directed to a method and apparatus for detecting hand gestures and translating or converting the hand gestures into speech or text. The apparatus includes a plurality of sensors to detect dynamic movement and position of the hand and fingers. The sensors are connected to an electronic circuit that converts the signals from the sensors into speech or text.

The method and apparatus of the invention are suitable for converting any hand gesture into computer readable characters, such as ASCII characters. The apparatus in one embodiment of the invention is adapted for detecting and converting sign language, and particularly, the American Sign Language. The method and apparatus in one embodiment detect hand movement and posture and convert the detected movement and posture into written text or synthesized voice. In the embodiments described herein, the written text or synthesized voice is in English although other non-English languages can be generated. Although the embodiments described herein refer to the American Sign Language, the detected hand movements are not limited to sign language. The apparatus is also suitable for use for other visual systems such as a computer mouse to grasp, drag, drop and activate virtual objects on a computer, and particularly a desktop computer. Other uses include video games and various training devices, flight simulators, and the like.

Figure 1:
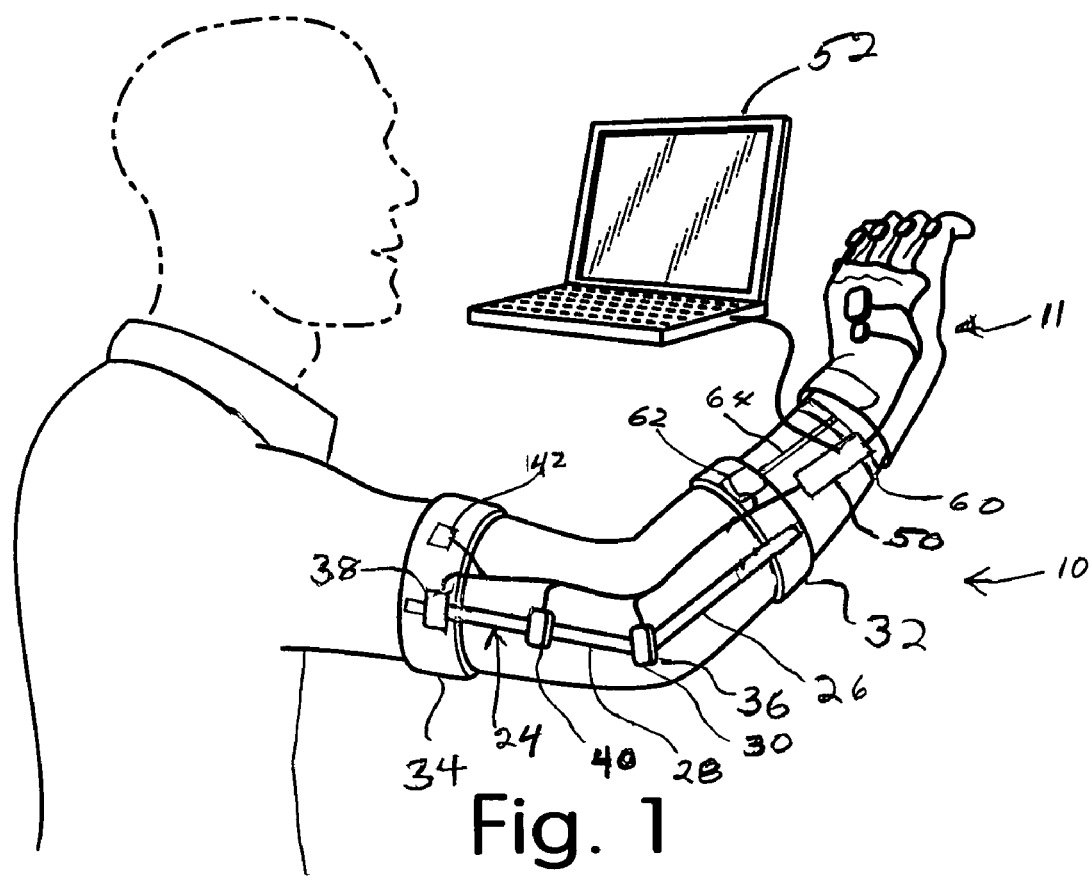
FIG. 1 is a side view of the apparatus showing the frame and sensors.

Referring to FIG. 1, the apparatus of the invention is able to detect and measure hand movement and position for detecting hand gestures and particularly hand gestures corresponding to sign language. The apparatus is able to detect and measure hand position and orientation relative to one or more parts of the body of the user. The apparatus is connected to the arm and hand of the user to detect and measure movement and orientation of the hand. In the embodiment shown in FIG. 1, the apparatus 10 is coupled to one arm and hand of the user for purposes of illustration. In another embodiment of the invention, the apparatus 10 includes an assembly connected to each arm and hand to simultaneously detect and measure hand position, movement and orientation of each hand with respect to the body of the user and to the other hand. The data from the apparatus on each arm is supplied to a computer to process the data and translate the signs into written text or speech. The apparatus and method of the invention can detect and translate complete signs, individual letters, words and a combination thereof.

As shown in the embodiment of FIG. 1, apparatus 10 includes a glove 11 to fit the user's hand and includes a plurality of sensors to measure and detect movement, position and orientation of the fingers and hand. Each finger 12 includes a sensor 14 to detect angular position of the respective finger. In preferred embodiments of the invention, the sensors are dual-axis accelerometers to detect absolute angular position with respect to gravity. Each sensor has two independent and perpendicular axes of reading. The first axis is positioned on the back of the finger along the phalanx. The other axis is oriented perpendicular to the first axis, along an axis parallel to the plane of the fingernail. In this manner, the accelerometer measures the orientation and flexion of each finger with respect to gravity.

The thumb in one preferred embodiment has two sensors 16, 18 to detect movement and bending of the thumb. The first sensor 16 is positioned over the thumb nail along an axis parallel to the longitudinal axis of the thumb nail. The second sensor 18 is oriented along an axis perpendicular to the axes of the first sensor 16.

Figure 2:
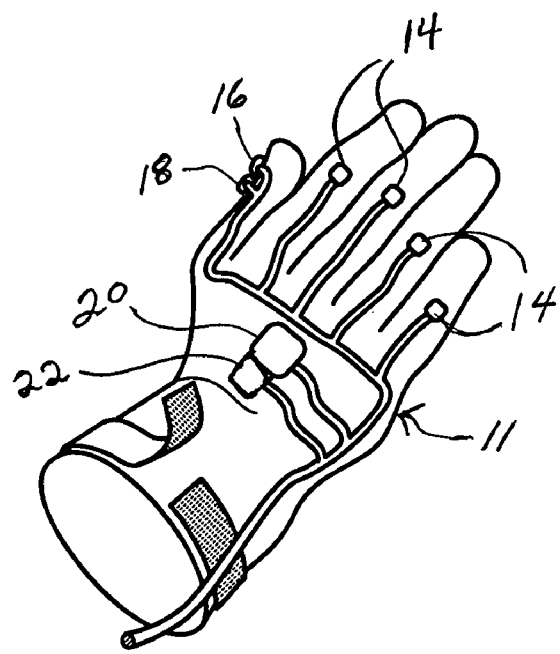
FIG. 2 is a perspective view of the glove in one embodiment of the invention.

The human hand has 17 active joints above the wrist. The index, middle, ring, little finger and the thumb, each have three joints. The wrist flexes about perpendicular axes with respect to the forearm which are referred to as the pitch and yaw. The rolling motion of the wrist is generated at the elbow. The number of joints needed to distinguish between signs is an important factor in the assembly for detecting and translating hand gestures. The assembly of the invention acquires sufficient information of the movement of the joints to avoid ambiguity, thereby maintaining the recognition rate to acceptable levels. Ambiguity refers to acquiring the same or similar signals corresponding to different hand postures, thereby preventing accurate recognition of the hand posture and position. To avoid or reduce the ambiguity, the apparatus of the invention attaches four dual-axis sensors 14 to the glove 11, with one sensor 14 on the middle phalanx of each finger 12. As shown in FIG. 2, two dual-axis sensors 16, 18 are positioned on the distal phalanx of the thumb 19. The arrangement of the sensors eliminate the ambiguity for the 26 postures of the American Sign Language (ASL).

Two hand sensors 20 and 22 are positioned on the back of the hand to detect hand movement and orientation. In one preferred embodiment, hand sensors 20 and 22 are dual-axis sensors. The first sensor 20 is positioned such that its two axes are parallel to the plane defined by the palm. The second sensor 22 is positioned such that one of its axes is perpendicular to the plane of the palm. The arrangement of the sensors 20, 22 enable precise detection of the movement, position and orientation of the hand in three dimensions.

In the embodiment illustrated, the sensors are attached to a glove 11 that can be put on and removed by the user. The glove 11 is typically made of a fabric or other material with adjustable members to provide a secure fit. In alternative embodiments, the sensors 14, 16, 18 can be attached to rings or pads that can be positioned on the fingers and hand in the selected locations.

As shown in FIG. 1, assembly 10 also includes a frame 24 that is adapted to be coupled to the arm of the user to detect arm movement and position with respect to the body and to detect movement and position of the hand with respect to various parts of the body. Frame 24 includes a first section 26 and a second section 28 coupled to a hinge 30 for pivotal movement with respect to each other. A strap or band 32 is coupled to first section 26 for removably coupling first section 26 to the forearm of the user and typically is made of a flexible material and can be adjusted to accommodate different users. A strap or band 34 is coupled to second section 28 for removably coupling section 28 to the upper arm of the user. Hinge 30 is positioned to allow the user to flex the elbow and allow the first section 26 to bend with respect to the second section 28. Each band 32, 34 typically includes a suitable fastener, such as a hook and loop fastener, for securing the bands around the arm of the user.

An angular sensor 36 is coupled to hinge 30 to measure angular movement between the forearm and the upper arm and the relative position of the hand with respect to the body of the user. The angular sensor 36 can be a potentiometer, rotary encoder, or other sensor capable of measuring the angle between the upper and lower arms of the user.

Second section 28 of frame 24 includes a twist sensor 38 to detect and measure twist of the arm, and an angular sensor 40 to detect and measure rotation of the arm. In the embodiment illustrated, the twist sensor 38 is positioned on the band 34 of the second section 28 at a distal or upper end opposite hinge 30. In other embodiments, twist sensor 38 can be coupled to the second section 28 of frame 24. Twist sensor 38 is preferably a potentiometer, rotary encoder, or other angular sensor that can be attached to the frame 24 or upper arm of the user to detect a twisting motion of the arm or wrist in reference to the elbow of the user.

In one embodiment, angular sensor 40 is coupled to second section 28 of frame 24 that is positioned to measure upper arm twist. Angular sensor 40 can be an accelerometer, dual axis tilt meter, dual axis gyroscope, or other sensor capable of measuring angular motion of the upper arm.

Alternatively, a sensor 42 can be positioned on the band 34 on the front side. The position of the sensor 42 can be selected according to the individual. More specifically, sensor 42 measures arm elevation and rotation. Typically, sensor 42 is an accelerometer. The elevation of the upper arm is defined as the rotational angle around the imaginary axis running between the two shoulders of the user. Rotation is defined as the rotational angle around an imaginary axis extending in front (perpendicular to the axis connecting) of the two shoulders of the user.

In another embodiment of the invention, a sensor 62 is used to measure and detect wrist and forearm twist. In another preferred embodiment, a wrist strap 60 is provided around the wrist to rotate with rotational movement of the wrist. A potentiometer 62 is mounted on the strap 32 has a shaft coupled to a link 64 that extends toward the wrist strap 60. The end of the link 64 is coupled to the wrist strap 60 to twist with the wrist. Rotation of the wrist causes movement of the link 64 and the shaft of the potentiometer so that twisting movement of the wrist s detected by the potentiometer 62. In an alternative embodiment the potentiometer can be located in other areas that will effectively measure the twisting movement of the wrist.

The accelerometer as used in the embodiments of the apparatus can be commercially available devices as known in the art. The accelerometers include a small mass suspended by springs. Capacitive sensors are distributed along two orthogonal axes X and Y to provide a measurement proportional to the displacement of the mass with respect to its rest position. The mass is displaced from the center rest position by the acceleration or by the inclination with respect to the gravitational vector (g). The sensors are able to measure the absolute angular position of the accelerometer.

In preferred embodiments, the Y-axis of the accelerometer is oriented toward the fingertip to provide a measure of joint flexion. The X-axis is used to provide information of hand roll or yaw or individual finger abduction. A total of twelve signals are measured for the fingers and thumb. The palm orientation relative to the wrist can be viewed as affecting all fingers simultaneously which allow all of the X-axis measurements to be eliminated. However, it has been observed that this generally is not correct since certain letters of the sign language differ on the orientation in the X-direction of individual fingers. For example, the postures for the letter "U" and "V" differ only by the orientation of the index and middle fingers in the X-direction.

The apparatus 10 is able to detect a phonetic model by treating each sign as a sequential execution of two measurable phonemes; one static and one dynamic. As used herein, the term "pose" refers to a static phoneme composed of three simultaneous and inseparate components represented by a vector P. The vector P corresponds to the hand shape, palm orientation and hand location. The set of all possible combinations of P defines the Pose space. The static phoneme pose occurs at the beginning and end of a gesture. A "posture" is represented by Ps and is defined by the hand shape and palm orientation. The set of all possible combination of Ps can be regarded as a subspace of the pose space. Twenty-four of the 26 letters of the ASL alphabet are postures that keep their meaning regardless of location. The other two letters include a movement and are not considered postures.

Movement is the dynamic phoneme represented by M. The movement is defined by the shape and direction of the trajectory described by the hands when traveling between successive poses. A manual gesture is defined by a sequence of poses and movements such as P-M-P where P and M are as defined above.

A set of purely manual gestures that convey meaning in ASL is called a lexicon and is represented by L. A single manual gesture is called a sign, and represented by s, if it belongs to L. Signing space refers to the physical location where the signs take place. This space is located in front of the signer and is limited to a cube defined by the head, back, shoulders and waist.

As used herein, a lexicon of one-handed signs of the type Pose-Movement-Pose is selected for recognition based on the framework set by these definitions. The recognition system is divided into smaller systems trained to recognize a finite number of phonemes. Since any word is a new combination of the same phonemes, the individual systems do not need to be retrained when new words are added to the lexicon.

Figure 3:
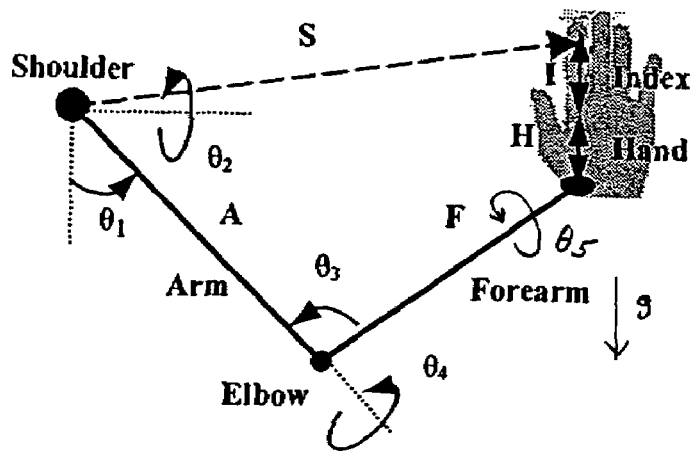
FIG. 3 is a schematic view showing the vectors that define the movement of the frame and glove.

The apparatus 10 of FIG. 1 is constructed to detect movement and position of the hand and fingers with respect to a fixed reference point. In this embodiment, the fixed reference point is defined as the shoulder. FIG. 3 is a schematic diagram showing the various measurements by the sensors of the apparatus. As shown in FIG. 3, the shoulder of the user defines the fixed or reference point about which the sensors detect motion and position. Rotation sensor 40 on second section 28 of frame 24 is oriented so that the X-axis detects arm elevation $\theta_i$ and the Y-axis detects arm rotation $\theta_2$. The angular sensor 36 on the joint between the first section 26 and second section 28 measures the angle of flexing or movement $\theta_3$. The twist sensor 38 on the upper end of second section 28 of frame 24 measure forearm rotation $\theta_4$.

In the embodiment of FIG. 3, the shoulder and elbow are modeled as 2-degrees of freedom joints. The palm and fingers are molded as telescopic links whose lengths H and I are calculated as the projections of the hand and the index lengths onto the gravitational vector g, based on the angle measured by the sensors on the glove. The vector A is defined by the upper arm as measured from the shoulder to the elbow. The vector F is defined by the lower arm as measured from the elbow to the wrist. The vector H is defined by the hand as measured from the wrist to the middle knuckle. The vector I is defined by the index finger as measured from the middle knuckle. The vector S points to the position of the index finger as measured from the shoulder or reference point. By measuring the movements and position of the sensors, the vector S can be calculated to determine the position and orientation of the hand with respect to the shoulder or other reference point. Since the shoulder is in a fixed position relative to the apparatus, an approximate or relative position of the hand with respect to the head can also be determined. The hand position with respect to the head is approximated since the head is not fixed.

Figure 4:
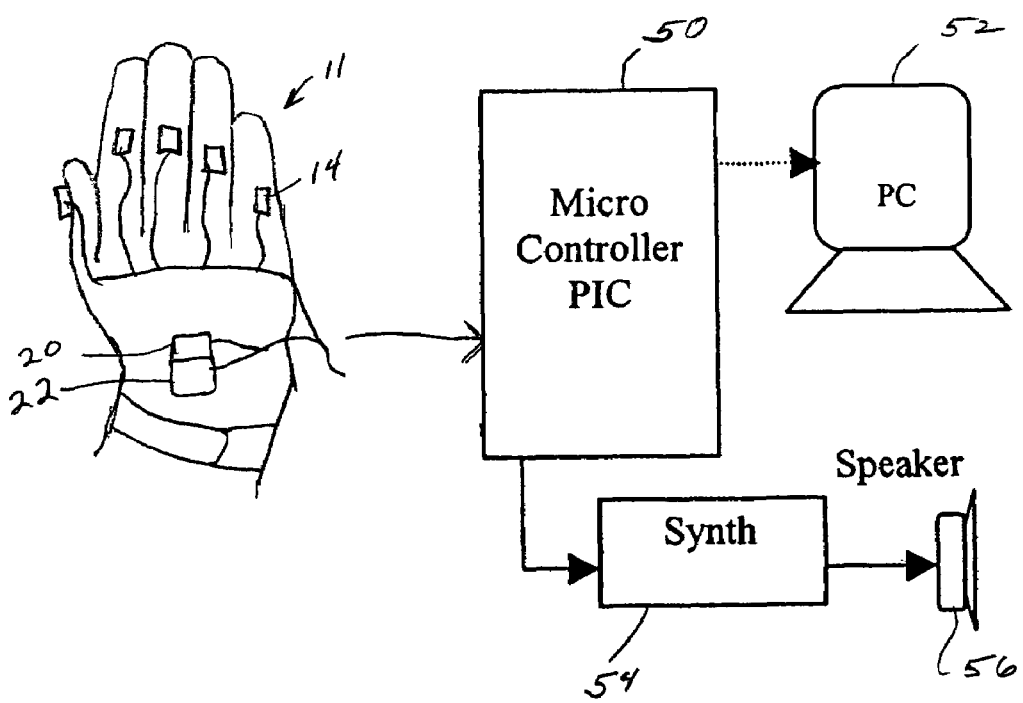
FIG. 4 is a block diagram showing the assembly of the invention.

Referring to FIG. 4, the assembly is formed by the glove 11 connected to a programmable microcontroller or microprocessor 50 to receive and process the signals from the sensors on the apparatus 10. The glove 11 and frame 24 with the associated sensors define an input assembly that is able to detect dynamic movements and positions of each finger and thumb independently of one another and generate values corresponding to a phoneme. The microprocessor 50 receives the signals corresponding to the hand gestures or phonemes. The microprocessor 50 is connected to a display unit 52 such as a PC display, PDA display, LED display, LCD display, or any other stand alone or built-in display that is able to receive serial input of ASCII characters. The microprocessor includes a word storage for storing sign language phonemes and is able to receive the signals corresponding to the phonemes, and match the value with a stored phoneme-based lexicon. The microprocessor 50 then produces an output value corresponding to the language. The microprocessor in the embodiment of FIG. 1 can be attached to the assembly 10 on the arm of the user as shown in FIG. 1 or as a separate unit. A speech synthesizer 54 and a speaker 54 can be connected to microprocessor 50 to generate a synthesized voice.

The sensors, and particularly the accelerometers, produce a digital output so that no A/D converter is necessary and a single chip microprocessor can be used. The microprocessor can feed the ASCII characters of the recognized letter or word to a voice synthesizer to produce a synthesized voice of the letter or word.

In operation, the user performs a gesture going from the starting pose to the final pose. The spatial components are detected and measured. The microprocessor receives the data, performs a search on a list that contains the description of all of the signs in the lexicon. The recognition process starts by selecting all of the gestures in the lexicon that start at the same initial pose and places them in a first list. This list is then processed to select all of the gestures with similar location and places them in a second list. The list is again processed to select gestures based on the next spatial component. The process is completed when all of the components have been compared or there is only one gesture in the list. This process is referred to as conditional template matching carried out by the microprocessor. The order of the selection can be varied depending on the programming of the microprocessor. For example, the initial pose, movement and next pose can be processed and searched in any desired order.

The accelerometer's position is read measuring the duty cycle of a train of pulses of 1 kHz. When a sensor is in its horizontal position, the duty cycle is 50%. When it is tilted from +90° to −90°, the duty cycle varies from 37.5% (0.375 msec) to 62.5% (0.625 msec), respectively. The microcontroller monitors the output, and measures how long the output remains high (pulse width), using a 2 microsecond clock counter, meaning a range from (375/2)=187 counts for 90° to a maximum of (625/2)=312 counts for −90°, a span of 125 counts. After proper calibration the output is adjusted to fit an eight-bit variable. Nonlinearity and saturation, two characteristics of this mechanical device, reduce the usable range to ±80°. Therefore, the resolution is (160°/125 counts)=1.25° per count. The error of any measure was found to be ±1 bit, or ±1.25°. The frequency of the output train of pulses can be lowered to produce a larger span, which is traded for a better resolution; e.g. to 500 Hz to produce a resolution of ±0.62°, with a span that still fits on eight bit variables after proper calibration.

Seventeen pulse widths are read sequentially by the microcontroller, beginning with the X-axis followed by the Y-axis, thumb first, then the palm, and the shoulder last. It takes 17 milliseconds to gather all finger, palm, and arm positions. Arm twist and elbow flexion are analog signals decoded by the microcontroller with 10-bit resolution. A package of 21 bytes is sent to a PC running the recognition program, through a serial port.

Seventeen volunteers (between novice and native signer) were asked to wear the prototype shown in FIG. 1 and to sign 53 hand postures, including all letters of the alphabet, fifteen times. Letters "J" and "Z" are sampled only at their final position. This allows capturing of the differences and similarities among signers.

The set of measurements, two axes per finger, three for the palm, and four for the arm, represents the vector of raw data. The invention extracts a set of features that represents a posture without ambiguity in "posture space". The invention is different from all other devices in that it is able to measure not only finger flexion (hand shape), but hand orientation (with respect to the gravitational vector) without the need for any other external sensor like a magnetic tracker or Mattel's™ ultrasonic trackers.

In one embodiment of the invention, the apparatus includes an indicator such as a switch or push button that can be actuated by the user to indicate the beginning and end of a gesture. Approximately one millisecond is needed to read axis sensors of the accelerometer and resistive sensors by the microprocessor running at 20 mHz. One byte per signal is sent by a serial port at 9600 baud to the computer. The program reads the signals and extracts the features, discriminate postures, locations, movements, and searches for the specific sign.

The classification algorithm for postures is a decision tree that starts finding vertical, horizontal and upside down orientations based on hand pitch. The remaining orientations are found based on hand roll: horizontal tilted, horizontal palm up, and horizontal tilted counter clockwise. The three signals from the back of the palm are used for this purpose.

The posture module progressively discriminates postures based on the position of fingers on eight decision trees. Five of the decision trees correspond to each orientation of the palm plus three trees for vertical postures. The vertical postures are divided into vertical-open, vertical-horizontal, and vertical-closed based on the position of the index finger. The eight decision trees are generated as follows:

For each decision tree do:
First node discriminates posture based on position of the little finger.
Subsequent nodes are based on discrimination of the next finger.
If postures are not discriminated by finger flexion, then continue with finger abduction.
If postures are not determined by finger flexions or abductions, then discriminate by the overall finger flexion and overall finger roll.
Overall finger flexion is computed by adding all y-axes on fingers, similarly, overall finger roll is computed by adding all x-axes on fingers.
Thresholds on each decision node are set based on the data gathered from the 17 volunteers.

Eleven locations in the signing space were identified as starting and ending positions for the signs in the lexicon composed by one-handed signs: head, cheek, chin, right shoulder, chest, left shoulder, stomach, elbow, far head, far chest and far stomach. Signers located their hand at the initial poses of the following signs: FATHER, KNOW, TOMORROW, WINE, THANK YOU, NOTHING, WHERE, TOILET, PLEASE, SORRY, KING, QUEEN, COFFEE, PROUD, DRINK, GOD, YOU, FRENCH FRIES and THING. From all the signs starting or finishing at the eleven regions, these signs were selected randomly.

Figure 5A:
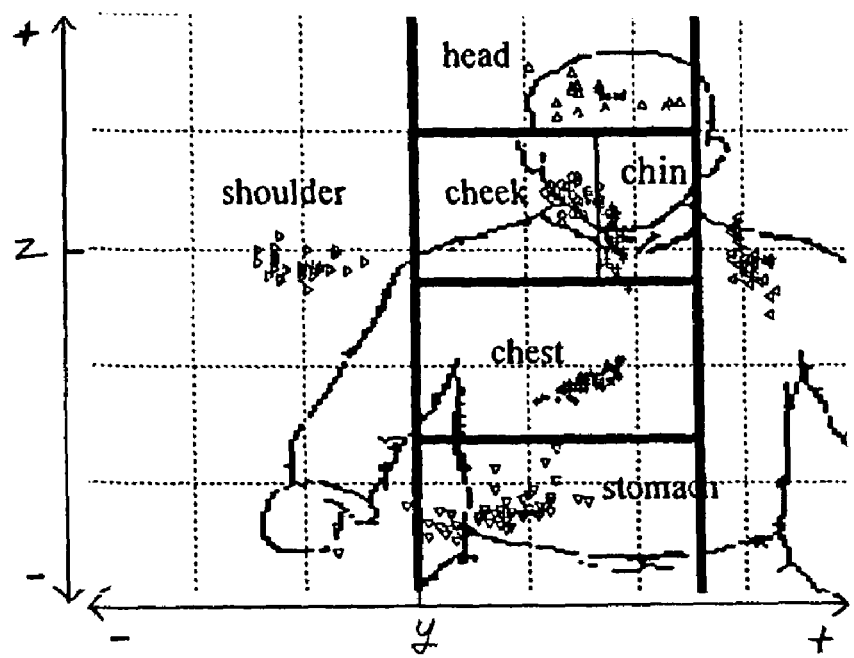
FIGS. 5A and 5B are charts showing the coordinates indicating the position of the hand relative to the body of the user.

The coordinates of vector S in FIG. 3 were calculated using values of F=A=10, and H=I=3 that represent upper-arm, arm, hand and finger length's proportions. The sampled points in the signing space are plotted in FIGS. 5A and 5B. FIG. 5A corresponds to locations close to the body and FIG. 5B corresponds to locations away from the body. A human silhouette is superimposed on the plane in FIGS. 5A and 5B to show locations related to signer's body. The plane y-z is parallel to the signer's chest, with positive values of y running from the right shoulder to the left shoulder, and positive values of z above the right shoulder.

Equations to solve position of the hand are based on the angles shown in FIG. 3 where $\theta_4$=elbow flexion $\theta_3$=forearm twisting $\theta_2$=upper arm rotation $\theta_1$=upper arm elevation The projection of the palm and finger onto the gravity vector are computed as $$palmz := H * \sin(palm);$$

$$fingz := I * \cos(index);$$

In the first step in the process the coordinates are computed with respect to a coordinate system attached to the shoulder that moves with the upper arm:

$$x := F * \sin(\theta_4) * \sin(\theta_3);$$

$$y := F * \cos(\theta_3) * \sin(\theta_4);$$

$$z := -F * \cos(\theta_4) - A;$$

Figure 5B:
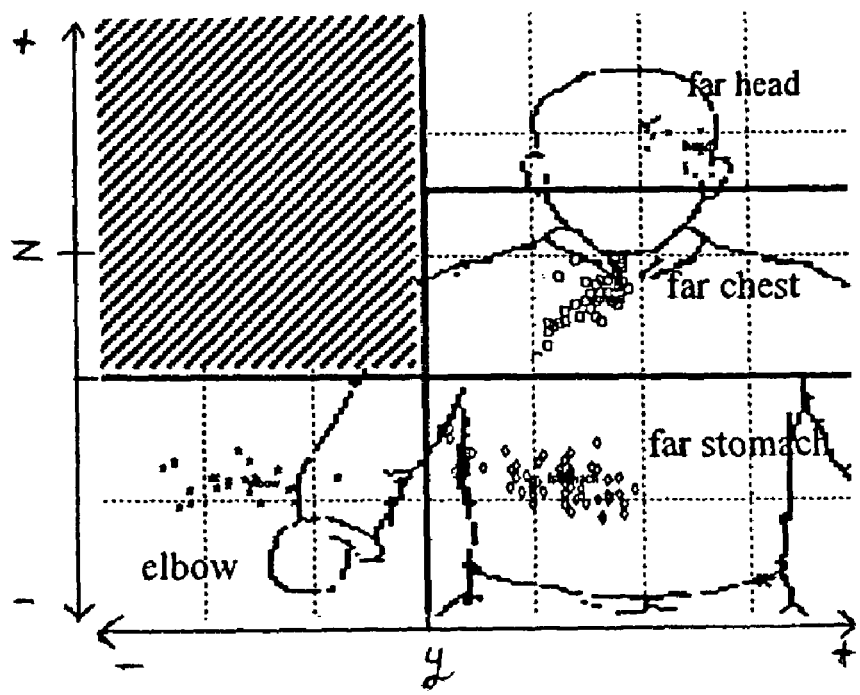

On the second step this coordinates are translated to a fixed coordinate system mounted on the shoulder. Coordinates are translated with arm elevation $\theta_1$:

$$ax := x * \cos(\theta_1) - z * \sin(\theta_1);$$

$$ay := y;$$

$$az := x * \sin(\theta_1) + z * \cos(\theta_1);$$

and with arm rotation $\theta_2$ $$y := ay * \cos(\theta_2) - az * \sin(\theta_2);$$

$$z := az * \cos(\theta_2) + ay * \sin(\theta_2);$$

$$z := az + palmz + fingz;$$

these are the coordinates of the hand used to plot FIGS. 5A and 5B.

Similar to orientations and postures, locations are solved using a decision tree. The first node discriminates between close and far locations; subsequent nodes use thresholds on y and z that bound the eleven regions. It was possible to set the thresholds on y and z at least 4σ around the mean, so that signers of different heights can use the system if a calibration routine is provided to set the proper thresholds.

The evaluation of the location module is based on the samples used to train the thresholds. The accuracy rate averaged: head 98%, cheek 95.5%, chin 97.5%, shoulder 96.5%, chest 99.5%, left shoulder 98.5%, far chest 99.5%, elbow 94.5%, stomach, far head and far stomach 100%. The overall accuracy was 98.1%.

Movements of the one-handed signs are described by means of two movement primitives: shape and direction. Shapes are classified based on the curviness defined as the relation of the total distance traveled divided by the direct distance between ending points. This metric is orientation and scale independent. As with the case of hand shapes and locations, the exact execution of a curve varies from signer to signer and from trial to trial. Thresholds to decide straight or circular movements were set experimentally by computing the mean over several trails performed by the same signers. A curviness greater than 4 discriminated circles from straight lines with 100% accuracy.

Direction is defined as the relative location of the ending pose with respect to the initial pose (up, down, right, left, towards, and away) determined by the maximum displacement between starting and end locations as follows:

$$\text{Direction} = \max(|\Delta x|, |\Delta y|, |z|)$$

where $\Delta x = x_{final} - x_{initial}$, $\Delta y = y_{final} - y_{initial}$, $\Delta z = Z_{final} - z_{initial}$; and x, y, z are the coordinates defining hand location.

To classify complete signs, conditional template matching was used, which is a variation of template matching. Conditional template matching compares the incoming vector of components (captured with the instrument) with a template (in the lexicon) component by component and stops the comparison when a condition is met:

Extract a list of signs with same initial posture recognized by the corresponding module.

This is the first list of candidate signs.

Select the signs with same initial location recognized by the corresponding module.

This is the new list of candidate signs.

Repeat the selection and creation of new lists of candidates by using movement, final posture and final location.

Until all components have been used OR when there is only one sign on the list. That sign on the list is called "the most likely".

Figure 6A:
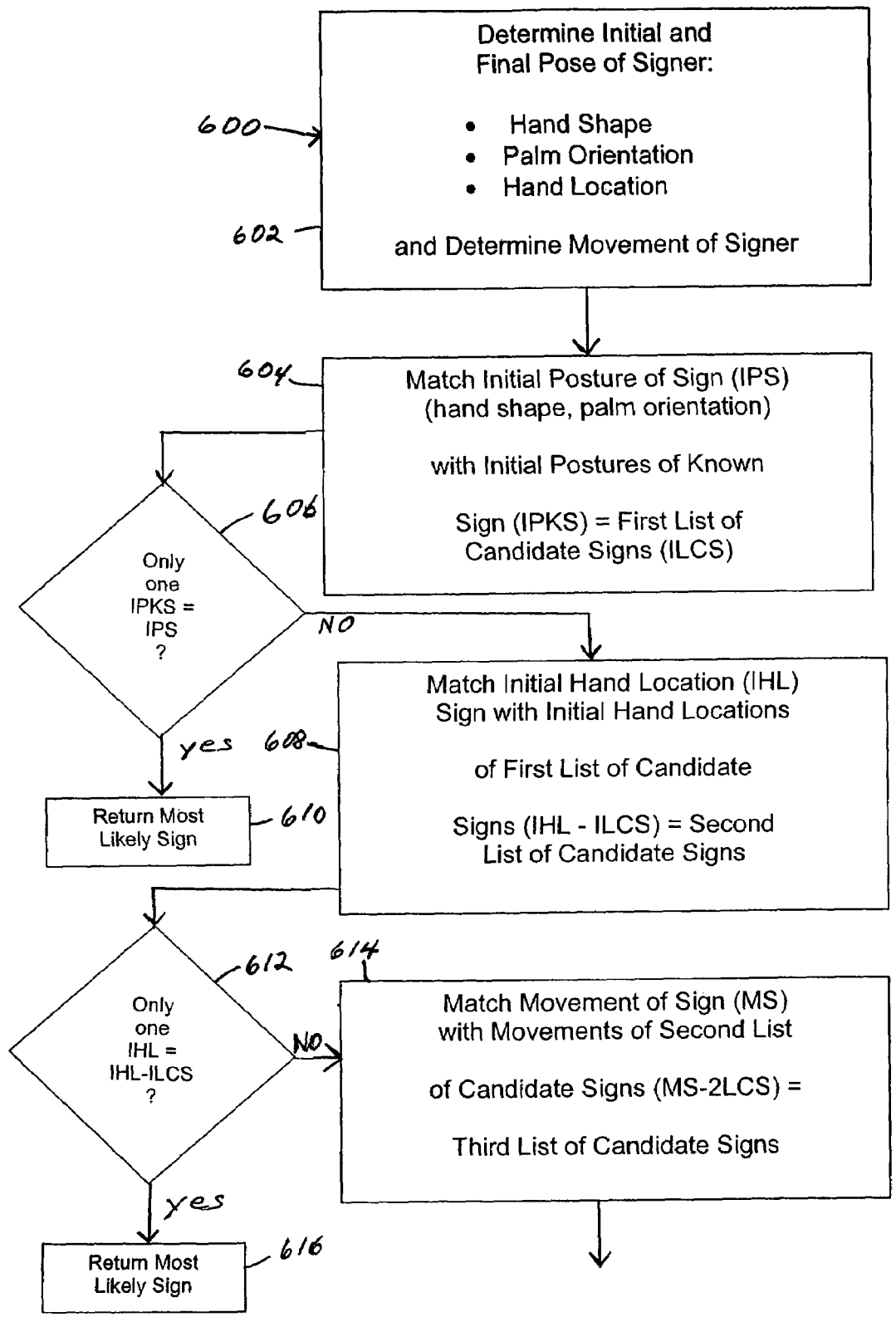
FIGS. 6A and 6B are a flow diagram depicting the method of translating the hand gestures to text.
Figure 6B:
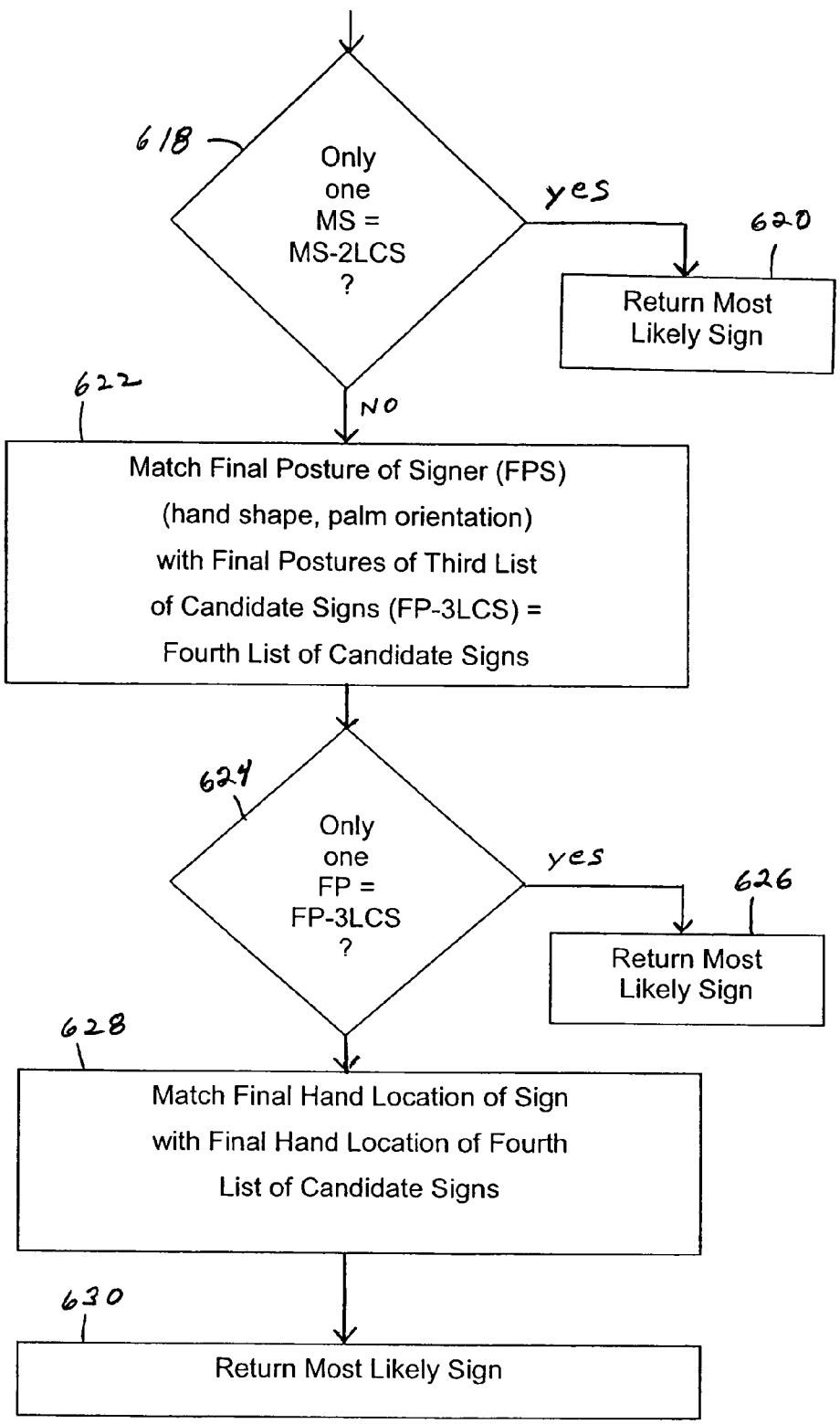

The method for translating hand gestures according to an embodiment of the present invention is shown in FIGS. 6A and 6B. The method 600 begins with step 602 in which the initial and final pose of the sign, as well as the movement of the sign, are determined using the apparatus shown in FIGS. 1, 2 and 4. The sign is determined by detecting the hand shape, palm orientation and hand location. The method is carried out in the micro-controller using software code in the form of algorithms as described herein. The system shown in FIG. 4 includes a computer, display, communication cables and speaker for audio transmission of the translated hand gesture into aurally-recognizable word or phrase. The processing of the digital signals generated by the accelerometers and position detectors occurs in the microcontroller, which can be located in the PC, on a micro-chip on the back of a hand of the signer, or remotely, if a wireless communication system is implemented. The wireless means of communication can include infra-red, RF or any other means of wireless communication capabilities. Furthermore, the system according to one embodiment of the present invention (not shown) can be interfaced with a network (LAN, WAN) or the Internet, if desired. The details of such interconnections, well known to those skilled in the art, have been omitted for purposes of clarity and brevity.

In step 604, the method determines whether any one of the initial postures of known sign (IPKS) matches the determined initial posture of the sign (IPS). In decision step 606, the method determines whether there is only one match between the IPS and the IPKS. If there is only one match, then that match is the most likely sign ("Yes" path from decision step 606), and the most likely match sign is returned to the processor and stored (in step 610). If there are more than one match to the IPS, then the matches becomes a first list of candidate signs (1LCS) ("No" path from decision step 606).

The method then proceeds to step 608. In step 608, the method determines whether any one of the hand locations of the signs of the first list of candidate signs (IHL-1LCS) matches the determined initial hand locations (IHL). In decision step 612, the method determines whether there is only one match between the IHL and the IHL-LLCS. If there is only one match, then that match is the most likely sign ("Yes" path from decision step 612), and the most likely match sign is returned to the processor and stored (in step 616). If there are more than one match to the IHL, then the matches become a second list of candidate signs (2LCS) ("No" path from decision step 612).

The method then proceeds to step 614. In step 614, the method determines whether any one of the movements of the signs of the second list of candidate signs (MS-2LCS) matches the determined movements of the sign (MS). In decision step 618, the method determines whether there is only one match between the MS and the MS-2LCS. If there is only one match, then that match is the most likely sign ("Yes" path from decision step 618), and the most likely match sign is returned to the processor and stored (in step 620). If there are more than one match to the MS, then the matches become a third list of candidate signs (3LCS) ("No" path from decision step 618).

The method then proceeds to step 622. In step 622, the method determines whether any one of the final postures of the third list of candidate signs (FP-3LCS) matches the determined final posture of the sign (FPS). In decision step 624, the method determines whether there is only one match between the FPS and the FP-3LCS. If there is only one match, then that match is the most likely sign ("Yes" path from decision step 624), and the most likely match sign is returned to the processor and stored (in step 626). If there are more than one match to the FPS, then the matches become a fourth list of candidate signs (4LCS) ("No" path from decision step 622).

The method then proceeds to step 628. In step 628, the method determines whether any one of the final hand locations of the fourth list of candidate signs (FHL-4LCS) matches the determined final hand locations (FHL). In step 628, the method matches the FHL and one of the FHL-4LCS. That match is the most likely sign, and is returned to the processor and stored (in step 630). The method then repeats itself for the next sign performed by the user.

This search algorithm will stop after finding the initial pose if there is only one sign with such initial pose in the lexicon. In those cases, the probability of finding the sign is equal to $P(ip|Xip) \cdot P(il|Xil)$, the product of the conditional probability of recognizing the initial pose given the input Xip from sensors, times the probability of recognizing the initial location given the input Xil. In the worst-case scenario, the accuracy of conditional template matching equals the accuracy of exact template matching when all conditional probabilities are multiplied:

$$P(sign) = P(ip|Xip) \cdot P(il|Xil) \cdot P(m|Xm) \cdot P(fp|Xfp) \cdot P(fl|Xfl)$$

where $P(m|Xm)$ is the probability of recognizing the movement given the input Xm, $P(fp|Xfp)$ is the probability of recognizing the final posture given the input Xfp, and $P(fl|Xfl)$ is the probability of recognizing the final location given the input Xfl.

To evaluate the search algorithm, a lexicon with only the one handed signs was created and tested, producing 30 signs: BEAUTIFUL, BLACK, BROWN, DINNER, DON'T LIKE, FATHER, FOOD, GOOD, HE, HUNGRY, I, LIE, LIKE, LOOK, MAN, MOTHER, PILL, RED, SEE, SORRY, STUPID, TAKE, TELEPHONE, THANK YOU, THEY, WATER, WE, WOMAN, YELLOW, and YOU.

To create the lexicon, the PMP sequences are extracted and written in an ASCII file. For example, the sign for BROWN starts with a 'B' posture on the cheek then moves down to the chin while preserving the posture. The PMP sequence stored in the file reads: B-cheek-down-B-chin-Brown. Another example, the sign for MOTHER is made tapping the thumb of a 5 posture against the chin, therefore the PMP sequence reads: 5-chin-null-5-chin-Mother. The ASCII file (the last word in the sequence) is then used to synthesize a voice of the word or is used to produce written text.

For a lexicon of two-handed signs, the sequences of phonemes are of the form P-M-P-P-M-P. The first triad corresponding to the dominant hand, i.e., right hand for right-handed people. The sign recognition based on the conditional template matching is easily extended to cover this representation. The algorithms for hand orientation, posture and location here shown also apply.

While various embodiments have been chosen to illustrate the invention, it will be understood by those skilled in the art that various changes and modifications can be made without departing from the scope of the invention as defined in the appended claims.

What is claimed is:

1. A sign language recognition apparatus comprising an input assembly for detecting sign language, a computer connected to said input assembly and generating an output signal for producing a visual or audible output corresponding to said sign language, said input assembly comprising:
   a glove to be worn by a user, said glove having sensors for detecting dynamic hand movements of each finger and thumb;
   an elbow sensor for detecting and measuring flexing and positioning of the forearm about the elbow; and
   a shoulder sensor for detecting movement and position of the arm with respect to the shoulder, wherein said input assembly further comprises a frame having a first section for coupling to the upper arm of the user and a second section for coupling to the forearm of the user, said first sections being coupled together by a hinge, said elbow sensor being positioned on said frame for measuring flexing and positioning of the forearm, and second section.

2. The apparatus of claim 1, wherein said shoulder sensor is coupled to said first section of said frame.

3. The apparatus of claim 2, wherein said shoulder sensor comprises a first sensor for detecting twisting of the arm.

4. The apparatus of claim 3, wherein said first sensor of said shoulder sensor comprises a resistive angular sensor.

5. The apparatus of claim 3, wherein said shoulder sensor further comprises an accelerometer for detecting motion, elevation and position of the upper arm with respect to the shoulder.

6. The apparatus of claim 1, wherein said glove includes a first accelerometer on each finger and thumb, a second accelerometer on the back of said glove to detect vertical orientation and movement of said glove, and a third accelerometer on the back of said glove to detect axial orientation and movement of said glove with respect to the forearm.

7. A method for translating a sign into a phoneme, comprising:
   determining an initial and final pose of the sign, and a movement of the sign, the movement occurring between the initial and final pose, the pose of the sign comprised of an initial posture part and a hand location part;
   matching a determined initial posture of the sign with one or more initial postures of all known signs, and defining a first list of candidate signs as those more than one signs whose posture matches the determined initial posture or, if there is only one match, returning a first most likely sign corresponding to the match;
   matching a captured initial hand location of the sign with one or more hand locations of the first list of candidate signs, and defining a second list of candidate signs as those more than one signs whose hand locations matches the determined initial hand location, or, if there is only one match, returning a second most likely sign corresponding to the match;
   matching a captured movement of the sign with one or more movements of the second list of candidate signs, and defining a third list of candidate signs as those more than one signs whose movements matches the determined movements, or, if there is only one match, returning a third most likely sign corresponding to the match;

matching a determined final posture of the sign with one or more postures of the third list of candidate signs, and defining a fourth list of candidate signs as those more than one signs whose final posture matches the determined final posture, or, if there is only one match, returning a fourth most likely sign corresponding to the match;

matching a determined final hand location of the sign with one hand location of the fourth list of candidate signs, and returning a fifth most likely sign corresponding to the match; and converting the first, second, third, fourth or fifth sign into a stream of ASCII characters to be displayed as text and/or to a voice synthesizer to be reproduced as speech.

8. The method for translating a sign of claim 7, wherein said method transmits said most likely sign as a stream of ASCII characters to be displayed as text or synthesized as voice in a language other than English.

9. The method for translating signs of claim 7, wherein only the first step is used to translate postures as letters of finger-spelled words.

* * * * *